United States Patent [19]
Terrell et al.

[11] 3,761,524
[45] Sept. 25, 1973

[54] ETHERIFICATION PROCESS
[75] Inventors: Ross C. Terrell, Plainfield; Alex J. Szur, North Plainfield, both of N.J.
[73] Assignee: Airco, Inc., New York, N.Y.
[22] Filed: May 3, 1971
[21] Appl. No.: 139,904

[52] U.S. Cl. .......................................... 260/614 F
[51] Int. Cl. ...................... C07c 43/00, C07c 41/00
[58] Field of Search .............................. 260/614 F

[56] References Cited
UNITED STATES PATENTS
| | | | |
|---|---|---|---|
| 3,637,477 | 1/1972 | Croix | 260/614 F X |
| 2,574,649 | 11/1951 | McBee et al. | 260/614 F |
| 3,549,711 | 12/1920 | Merrill et al. | 260/614 F |
| 3,291,843 | 12/1966 | Fritz | 260/614 F |
| 3,287,425 | 11/1966 | Maynard | 260/653.3 |
| 3,437,692 | 4/1969 | Pittman et al. | 260/614 F X |
| 3,480,605 | 12/1969 | Pittman et al. | 260/614 F X |

FOREIGN PATENTS OR APPLICATIONS
523,449   2/1940   Great Britain ................... 260/614 F OTHER PUBLICATIONS
Henne et al., J. Am. Chem., Soc. 72, 4378–4380, 1950
Corley et al. J. Am. Chem. Soc. 78, 3489–3493, 1956

Primary Examiner—Howard T. Mars
Attorney—Roger M. Rathbun, Edmund W. Bopp and H. Hume Mathews

[57] ABSTRACT

Trifluoroethanol and chlorodifluoromethane are reacted in the presence of an alkali metal hydroxide and a co-solvent system comprising water and one or more of N-methyl pyrrolidone, dimethyl sulfoxide, tetramethylene sulfone or diethyleneglycol dimethyl ether, to yield 2,2,2-trifluoroethyl difluoromethyl ether. N-methyl pyrrolidone is a preferred solvent.

9 Claims, No Drawings

ETHERIFICATION PROCESS

This invention relates to the preparation of 2,2,2-trifluoroethyl difluoromethyl ether which has the formula $CF_3CH_2\text{-}O\text{-}CHF_2$. More particularly, the invention concerns the process for making this fluorinated ether through the reaction of trifluoroethanol and chlorodifluoromethane in the presence of an alkali metal hydroxide. In the method of the invention an improvement in the yield of 2,2,2-trifluoroethyl difluoromethyl ether is obtained by providing in the reaction mixture a co-solvent system which comprises water and one or more of N-methyl pyrrolidone, dimethyl sulfoxide, tetramethylene sulfone or diethyleneglycol dimethylether.

U.S. Pat. Nos. 3,535,388 and 3,535,425 describe the preparation of 1-chloro-2,2,2-trifluoroethyl difluoromethyl ether, $CF_3CHCl\text{-}O\text{-}CHF_2$, which is useful as an anesthetic. Commonly-owned, copending application, Ser. No. 14,716, filed Feb. 20, 1970, now U.S. Pat. No. 3,637,477 in the name of Louise S. Croix, is directed to the preparation of 1-chloro-2,2,2-trifluoroethyl difluoromethyl ether by the reaction of trifluoroethanol and chlorodifluoromethane in the presence of an alkali metal hydroxide to form 2,2,2-trifluoroethyl difluoromethyl ether. The latter ether can be chlorinated to yield 1-chloro-2,2,2-trifluoroethyl difluoromethyl ether.

Although the preparation of 2,2,2-trifluoroethyl difluoromethyl ether by the reaction of trifluoroethanol and chlorodifluoromethane in the presence of alkali metal hydroxide has been found to be a quite advantageous procedure, improvement to increase the yield of the ether product is particularly desirable. By the present invention it has been found that this reaction can be conducted in the presence of co-solvents which include water and one or more of N-methyl pyrrolidone, dimethyl sulfoxide, tetramethylene sulfone (sulfolane) or diethylene glycol dimethyl ether. The use of N-methyl pyrrolidone is preferred since it leads to advantageous yields of 2,2,2-trifluoroethyl difluoromethyl ether.

In conducting the reaction the trifluoroethanol (2,2,2-trifluoroethanol), chlorodifluoromethane and alkali metal hydroxide can be combined in various ways, but the co-solvents of this invention are present during essentially all of the reaction. Thus the co-solvents are present when the trifluoroethanol and chlorodifluoromethane have substantial contact with the alkali metal hydroxide. Preferably the trifluoroethanol is first added to the solvent which may or may not contain water at that time. The chlorodifluoromethane is then combined with the reaction mixture, followed by the addition of the alkali metal hydroxide which may contain part or all of the water of the cosolvent system. After the desired extent of reaction between the trifluoroethanol and chlorodifluoromethane transpires, the 2,2,2-trifluoroethyl difluoromethyl ether can be separated from the reaction mixture by distillation.

According to the stoichiometry of the reaction of this invention trifluoroethanol and chlorodifluoromethane combine in essentially equal molar proportions, but either of these reactants may be present in excess during the reaction. If the chlorodifluoromethane is in gaseous form at the reaction pressure an excess of this material may be employed with advantage, while excess trifluoroethanol can serve as a solvent although it is relatively expensive which makes its use in this role unattractive.

The amount of alkali metal hydroxide in the system is sufficient to promote the desired reaction, and the amount (nonaqueous basis) which is often employed is about 25 to 200 or more weight % based on the weight of the trifluoroethanol charged to the reaction zone. Preferably this amount is about 90 to 150 weight percent. The co-solvents generally contain at least about 40 weight percent water, and more usually a major amount of water and a minor amount of the organic solvent component. Larger amounts of the organic solvent in the co-solvent system seem to offer no particular advantage which justifies the added expense. In any event, the amounts of organic solvent and the co-solvent system employed are sufficient to give an improvement in the yield of the desired ether product. The co-solvent system often contains about 5 to 30 weight percent, preferably about 10 to 20 percent, of total N-methyl pyrrolidone, dimethyl sulfoxide, tetramethylene sulfone and diethylene glycol dimethyl ether, with the essential balance being water. Generally, at least about 50 weight percent of the cosolvent system based on the weight of the trifluoroethanol charged to the reaction zone, will provide a significant improvement in the yield of 2,2,2-trifluoroethyl difluoromethyl ether, and preferably this amount is about 110 to 150 weight percent. No particular advantage has been found in using more than about 200 percent of the co-solvent system which justifies the extra expense.

The co-solvents of this invention when employed in the reaction of trifluoroethanol and chlorodifluoromethane in the presence of alkali metal hydroxide, permit the use of lower temperatures for a given reaction rate which in turn provides increased yields of the desired ether. Lower temperatures also enable the use of lower pressures which reduce the cost of equipment required for conducting the reaction. In general the reaction can be conducted at temperatures up to about 150° C. or somewhat more providing undue decomposition of the ether product is not experienced. There has not been indicated to be any particular advantage associated with using reaction temperatures less than ambient, although temperatures as low as about 0° C. have been employed without much difficulty. Preferably, the reaction is conducted at temperatures of about 20° to 75° C.

Although the reaction of the present invention can be conducted at ambient pressures it is advantageous to use elevated pressures, particularly since chlorodifluoromethane is a gas under normal conditions. The use of superatmospheric pressures may increase the rate of reaction and elevated pressures of up to about 500 or more pounds per square inch can conveniently be employed. Preferably the reaction is conducted under pressures of about 100 to 300 pounds per square inch.

The various alkali metal hydroxides can be employed in the process of this invention although sodium and potassium hydroxide are preferred in view of their relatively low cost and ease of handling. Although the alkali metal hydroxide can be used in anhydrous form this component is more conveniently added to the reaction as an aqueous solution. The water serves as part of the co-solvent system; however, excessive amounts of water, whether resulting from the use of aqueous alkali metal hydroxide or otherwise added to the reaction system, can cause decreases in yield of the desired 2,2,2-trifluoroethyl difluoromethyl ether. When the alkali

| Run No. | Solvent, grams | Temp., °C. | Reactants (moles) | | | Product, $CHF_2-O-CH_2CF_3$ | Wt. percent conversion based on TFE | Wt. percent yield based on TFE |
|---|---|---|---|---|---|---|---|---|
| | | | TFE | Freon-22 | Base | | | |
| 13 | | 90 | 1.0 | 1.0 | [1] 3.0 | 0.240 | 24.0 | 54.9 |
| 12 | DMSO [2], 10 | 90 | 1.0 | 1.0 | [1] 3.0 | 0.301 | 30.1 | 65.1 |
| 10 | | 90 | 1.0 | 1.0 | [3] 3.0 | 0.293 | 29.3 | 58.6 |
| 11 | DMSO, 10 | 90 | 1.0 | 1.0 | [3] 3.0 | 0.411 | 41.1 | 71.4 |
| 14 | DMSO, 20 | 90 | 1.0 | 1.0 | [3] 3.0 | 0.338 | 33.8 | 69.4 |
| 17 | NMP [4], 20 | 90 | 1.0 | 1.0 | [3] 3.0 | 0.332 | 33.2 | 62.4 |
| 20 | | 60 | 1.0 | 1.0 | [3] 3.0 | 0.323 | 32.3 | 60.4 |
| 15 | DMSO, 20 | 60 | 1.0 | 1.0 | [3] 3.0 | 0.371 | 37.1 | 67.4 |
| 18 | NMP, 20 | 60 | 1.0 | 1.0 | [3] 3.0 | 0.445 | 44.5 | 70.9 |
| 32 | | 25 | 1.0 | 1.0 | [3] 3.0 | 0.348 | 34.8 | 66.6 |
| 19 | NMP, 20 | 25 | 1.0 | 1.0 | [3] 1.0 | 0.471 | 47.1 | 76.3 |
| 29 | NMP, 40 | 25 | 1.0 | 2.0 | [3] 5.0 | 0.586 | 58.6 | 76.4 |
| 28 | NMP, 100 | 25 | 1.0 | 1.0 | [3] 2.3 | 0.505 | 50.5 | 79.8 |
| 30 | DEGDME [5], 20 | 25 | 1.0 | 1.0 | [3] 3.0 | 0.477 | 47.7 | 81.1 |
| 31 | Sulfolane, 20 | 25 | 1.0 | 1.0 | [3] 3.0 | 0.438 | 43.8 | 74.5 |
| 23 | NMP, 20 | 25 | 1.0 | 1.0 | [6] 3.0 | 0.399 | 39.9 | 64.1 |
| 22 | NMP, 20 | 0 | 1.0 | 1.0 | [3] 3.0 | 0.330 | 33.0 | 55.4 |

[1] =25 weight percent NaOH aqueous solution.
[2] =Dimethyl sulfoxide.
[3] =50 weight percent NaOH aqueous solution.
[4] =N-methyl pyrrolidone.
[5] =Diethylene glycol dimethyl ether.
[6] =50 weight percent KOH aqueous solution.

metal hydroxide is added to the reaction system as an aqueous solution it is preferred that the concentration of the solution be about 20 to 60 weight percent.

The following examples will serve to illustrate further the present invention.

EXAMPLE I

Trifluoroethanol, TFE, (100 g., 1 mole) and N-methylpyrrolidone (40 g.) are sealed in a 1 liter autoclave. Chlorodifluoromethane, Freon-22, (86.5 g., 1 mole) is added to the autoclave as a liquid through a buret. A 50 percent aqueous sodium hydroxide solution (184 g., 2.3 moles) is added at room temperature to the reaction mixture in 25 ml. increments over a period of 1 hour. The exotherm that is observed is controlled at about 25° C. by water cooling. The reaction mixture is stirred for three hours after the addition is complete. The autoclave is vented through a dry ice trap. The contents of the autoclave are transferred to a distillation flask and fractionated. The ether ($CHF_2$-$O$-$CH_2CF_3$) obtained amounts to 82.22 g. (0.548 mole, 54.8 percent conversion, 83.9 percent yield based on trifluoroethanol).

A similar run in the 1 liter autoclave without the N-methyl pyrrolidone co-solvent and with 3.0 moles of 50 percent aqueous sodium hydroxide gave only 52.18 g. (0.348 mole) of ether ($CHF_2$-$O$-$CH_2CF_3$) (34.8 percent conversion and 66.6 percent yield based on trifluoroethanol).

EXAMPLE II

The reaction procedure of Example I is repeated in a 1 gallon autoclave, using molar ratios of 5:5:15 for trifluoroethanol: chlorodifluoromethane: NaOH as a 50 percent aqueous solution, and 200 g. of N-methyl pyrrolidone. The reaction gave 428 g. (2.85 moles) of ether ($CHF_2$-$O$-$CH_2CF_3$) (57 percent conversion and 79.6 percent yield based on trifluoroethanol).

EXAMPLES III to V

The reaction procedure of Example I is repeated with different co-solvent systems and the results are as follows:

It is claimed:

1. A method for preparing 2,2,2-trifluoroethyl difluoromethyl ether by the reaction of 2,2,2-trifluoroethanol and chlorodifluoromethane in the presence of an alkali metal hydroxide the improvement which comprises conducting the reaction at a temperature of about 0° to 150° C. in the presence of a sufficient amount to improve the yield of 2,2,2-trifluoroethyl difluoromethyl ether, of a co-solvent system consisting essentially of water and a member selected from the group consisting of N-methyl pyrrolidone, dimethyl sulfoxide, tetramethylene sulfone and diethylene glycol dimethyl ether, said sufficient amount being in excess of 50 weight percent based on the weight of trifluoroethanol present, said selected member in said co-solvent system being sufficient in amount to increase to the yield of 2,2,2-trifluoroethyl difluoromethyl ether and comprising about 5 to 30 weight percent of the co-solvent system.

2. The method of claim 1 in which the selected member is N-methyl pyrrolidone.

3. The method of claim 2 in which the alkali metal hydroxide is sodium hydroxide.

4. The method of claim 3 in which the amount of co-solvent system is about 110 to 150 weight percent based on the trifluoroethanol, and the amount of selected member in the co-solvent system is about 10 to 20 weight percent of the co-solvent system.

5. The method of claim 1 in which the alkali metal hydroxide is added to the reaction mixture as an aqueous solution.

6. The method of claim 5 in which the alkali metal hydroxide is sodium hydroxide.

7. The method of claim 1 in which the amount of co-solvent system is about 110 to 150 weight % based on the trifluoroethanol, and the amount of selected member in the co-solvent system is about 10 to 20 weight % of the co-solvent system.

8. The method of claim 1 wherein the reaction is conducted at temperatures of about 20° to 75° C.

9. The method of claim 1 wherein the member comprises about 10 to 20 weight percent of the co-solvent system.

* * * * *